United States Patent [19]
Bellgardt et al.

[11] Patent Number: 4,569,228
[45] Date of Patent: Feb. 11, 1986

[54] PROBE TUBE WHICH CAN BE INTRODUCED INTO A REACTION CONTAINER FOR DETECTING THE OPERATING CONDITION OF A MEDIUM

[75] Inventors: Dieter Bellgardt; Werner Bauer, both of Apensen; Joachim Werther, Buchholz; Günter Ritter, Brühl, all of Fed. Rep. of Germany

[73] Assignee: Rheinische Braunkohlenwerke AG, Cologne, Fed. Rep. of Germany

[21] Appl. No.: 634,019

[22] PCT Filed: Nov. 17, 1983

[86] PCT No.: PCT/DE83/00194
§ 371 Date: Jul. 18, 1984
§ 102(e) Date: Jul. 18, 1984

[87] PCT Pub. No.: WO84/02184
PCT Pub. Date: Jun. 7, 1984

[30] Foreign Application Priority Data
Nov. 22, 1982 [DE] Fed. Rep. of Germany ....... 3243098

[51] Int. Cl.$^4$ ............................................ G01M 19/00
[52] U.S. Cl. ..................................... 73/432 R; 277/59; 356/342
[58] Field of Search ................. 73/432 B, 432 R, 756, 73/707, 198, 86, 863.85; 374/208, 147, 148, 150; 356/342; 324/65 P, 61 P; 277/59, 125, 26, 72 FM

[56] References Cited
U.S. PATENT DOCUMENTS

| | | | |
|---|---|---|---|
| 1,958,221 | 5/1934 | Wilcox | 277/59 |
| 2,012,049 | 8/1935 | Mercier . | |
| 2,248,982 | 7/1941 | Gillbergh | 324/65 P |
| 2,820,839 | 1/1958 | Schunke | 324/148 X |
| 2,864,252 | 12/1958 | Schaschl | 73/86 |
| 3,087,334 | 4/1963 | Brown | 73/198 |
| 3,259,392 | 7/1966 | Peickii et al. | 277/59 |
| 3,319,647 | 5/1967 | Moroin | 277/59 X |
| 3,438,397 | 4/1969 | Gilpin | 73/756 X |
| 3,983,756 | 10/1976 | Danguillier et al. | 73/432 B |
| 3,996,071 | 12/1976 | Klicks et al. . | |
| 4,457,369 | 7/1984 | Henderson | 277/235 R |

FOREIGN PATENT DOCUMENTS
715975 1/1942 Fed. Rep. of Germany .

Primary Examiner—Stewart J. Levy
Assistant Examiner—Tom Noland
Attorney, Agent, or Firm—Panitch Schwarze Jacobs & Nadel

[57] ABSTRACT

A probe tube which is introduced into a reaction container for measuring the operating condition of a medium in the interior of the container has a first seal which is resistant to temperature and a second seal which is resistant to pressure and gas-tight. Those seal respectively close the inner and outer ends of the probe tube. The interior of the probe tube communications with the interior of the reaction container by way of an opening, whereby the temperature-resistant seal at the tip of the probe tube is relieved of the loading of pressure forces.

7 Claims, 2 Drawing Figures

PROBE TUBE WHICH CAN BE INTRODUCED INTO A REACTION CONTAINER FOR DETECTING THE OPERATING CONDITION OF A MEDIUM

BACKGROUND OF THE INVENTION

The present invention relates to a probe or sampling tube which can be introduced into a reaction container for detecting the operating condition of a solid, liquid or gaseous medium in the interior of the container, which medium is possibly under pressure and/or at a high temperature. At its lower end, the probe tube has a measuring sensor which represents the end of measuring lines which are passed through the hollow space inside the tube and which are taken out at the upper end thereof. The probe tube is usually provided with a sealing means which sealingly surrounds the measuring lines so that the medium which is to be subjected to the operation of determining the operating condition thereof cannot escape from the interior of the container by way of the probe tube. Probes of that kind operate on different measuring principles, for example with electrical conductors or optical fibres.

Probe tubes of the above-indicated kind are used for example to detect the operating condition of bulk materials, in the nature of solid bodies, in a container, for example the generation of gases such as carbon dioxide ($CO_2$) or methane ($CH_4$) in a reactor containing lignite or brown coal dust, or other containers. Containers of that kind are usually not under pressure and the temperature in the interior of the containers is not substantially above ambient temperature.

However, the operating condition within gasification reactors of the high temperature Winkler (HTW) kind or for the hydrogenating gasification of coal (HGC) can also be measured with probe tubes, by detecting the nature and amount of the gases of solid-like coal particles which are gasified in the fluidized bed. In that case, temperatures and pressures are considerably above the ambient values. Probe tubes of the above-indicated kind are also used in reaction vessels in the hydrogenating liquefaction of carbonaceous material; in that case, the temperatures are in the range of from 300° C. to 500° C. while the pressures are from 100 to 500 bar.

The condition of the medium in the interior of the container goes from highly fluid to pasty consistency, but at the same time there are also gaseous conditions.

Measuring probes which are introduced into a reaction container of the kind last mentioned, during operation of the arrangement, are used for example to obtain information about the fluid-dynamic conditions, that is to say, the size and speed of the bubbles of gases which are introduced into or produced in the container. In addition, probes are intended to give information about the proportion of the gaseous phase in the liquid medium and the distribution in respect of size of the bubbles.

For that purpose, two measuring lines, for example optical fibres, are passed in parallel relationship with each other through the length of the probe tube and brought together at its lower end to a measuring sensor, while at the upper end of the probe tube which projects out of the reaction container, the measuring lines are taken out of the tube and connected to the appropriate measuring instruments. Laser light for example is passed through the first optical fibre referred to above, and taken back through the other optical fibre. Gas bubbles which impinge onto the measuring sensor reflect a part of the incident laser light so that it can be detected by way of the measuring line which is taken out of the probe tube. The frequency and intensity of the reflection phenomena are for example a measurement in respect of the gaseous phase which is dissolved in the liquid medium.

A measuring sensor of the above-described kind is highly sensitive and must be protected from damage and other mechanical influences, for example pressure forces. It is also necessary for the location at which the measuring lines are taken through the probe tube to be so gas-tight that the medium in the reaction container cannot escape therefrom. Casting or sealing materials have been used for that purpose, the space inside the probe tube being filled with such material so that the measuring lines are embedded in the material on all sides, while the casting material provides the necessary sealing action. It has been found however that known casting or sealing materials do not comply with all requirements in regard to the sealing action, such requirements arising out of the reaction conditions within the container. Thus for example it is possible to use a two-component adhesive to produce a sealing material which, although resistant to temperature, is not adequately pressure-resistant and gas-tight. There is no casting or sealing material which simultaneously complies with all three conditions, namely high level of resistance to temperature, for example above 300° C., high resistance to pressure, for example above 100 bars, and a high degree of gas-tightness, in particular in relation to low-molecular gases such as hydrogen ($H_2$) or helium (He).

Therefore, that frequently results in a one-sided pressure load and increased temperature loading on the measuring sensor, with the result that the measuring sensor is pushed into the interior of the probe tube and becomes pervious to gas. That means that such measuring probes become useless after a short period of operation.

Consequently, derived from those disadvantages is the problem of the present invention, of so designing measuring probes that they are protected from the temperatures and pressures occurring in the interior of the reaction container.

SUMMARY OF THE INVENTION

That problem is solved in that a sealing means which in particular is resistant to temperature is arranged preferably in the region of the measuring sensor, and a further sealing means is used in the region of the upper end of the probe tube, said further sealing means being resistant to pressure and gas-tight but not at the same time also being resistant to temperature. Therefore, under practical circumstances of use, it is provided that a casting or sealing material which is preferably resistant to high temperature is provided in the region of the measuring sensor while a casting or sealing material which is preferably resistant to pressure and gas-tight is used in the region of the upper end of the probe tube.

In accordance with a further feature, the interior of the probe tube, between the sealing means in the region of the measuring sensor and the sealing means at the upper end of the probe tube, which is taken out of the reaction container, can be filled with a medium which is in communication with the medium in the reaction container by way of an opening in the wall of the probe tube. In that respect, there is no need for the interior of the probe tube to be completely filled with the medium in accordance with the invention; on the contrary, it is sufficient for that medium to fill up the major part of the interior of the tube.

The above-mentioned medium can escape by way of the opening in the wall of the probe tube and communicate with the medium in the reaction container, which is necessary for example if the volume of the medium increases as a result of an increase in temperature; likewise however, the medium in the reaction container can also pass into the interior of the probe tube by way of the opening in the wall of the tube. The same pressure is effective on both sides of the sealing material which seals off the measuring sensor, by virtue of the above-mentioned communicating opening, so that this sealing means is completely relieved of pressure. With that arrangement, there is no possibility of displacement of and/or damage to the tips of the measuring lines, which end in the measuring sensor. The temperature resistance of the casting or sealing material in that region is sufficient to fix the tips of the measuring lines in the region of the measuring sensor, in their mutually relative positions.

It is necessary for the medium which fills the interior of the probe tube to be substantially resistant to pressure and temperature, while at the same time it may also be different from the medium in the reaction container. If on the other hand interchange in respect of the media in the probe and in the reactor is to be avoided, the medium that fills up the probe must also be incompressible. Those requirements in respect of resistance to pressure and temperature are fulfilled almost in an ideal fashion by oily liquids, for example mineral oils, while in addition a gaseous medium may also be considered, for filling the space inside the probe tube.

As it is only necessary to provide for pressure equalization between the interior of the probe tube and the interior of the reaction container, the opening in the wall of the probe tube may be in the form of a very small bore so that substantial amounts of the one medium cannot escape from the interior of the probe tube, nor can substantial amounts of the other medium pass into the probe tube from the interior of the container. There is scarcely any need to renew the medium once it has been introduced into the probe tube, for the losses which can occur by way of the opening in the wall are negligibly low and even if there should be a total loss of medium, the medium from the reaction container would make up for that loss and fill up the space inside the probe tube, which would in turn provide for equalization of the pressures on both sides of the measuring sensor.

In addition to that, it is also possible to envisage filling the interior of the probe tube with a gaseous medium, or not pre-filling it at all, for the medium which flows into the probe tube from the reaction vessel by way of the opening in the wall of the probe tube would compress the gaseous medium, in accordance with the adiabatic condition prevailing, so that it would build up a gas cushion in the upper region of the probe tube. An important consideration is that the end of the probe in each case projects out of the reactor sufficiently far so that the heat conducted by way of the metal wall of the probe can be reduced to such a degree that the upper sealing means does not suffer damage due to the reactor temperatures. For example temperatures of the order of magnitude of 500° C. and pressures of the order of magnitude of 300 bars obtain in a reactor for the liquefaction of coal; in that case, a probe tube with a normal outside cross-sectional diameter of 10mm must be taken out of the reactor for example to a distance of 500 mm.

BRIEF DESCRIPTION OF THE DRAWINGS

Further advantages of the invention will be apparent from the following description of an embodiment. In the drawings.

DESCRIPTION OF THE PREFERRED EMBODIMENT

Figure 1:
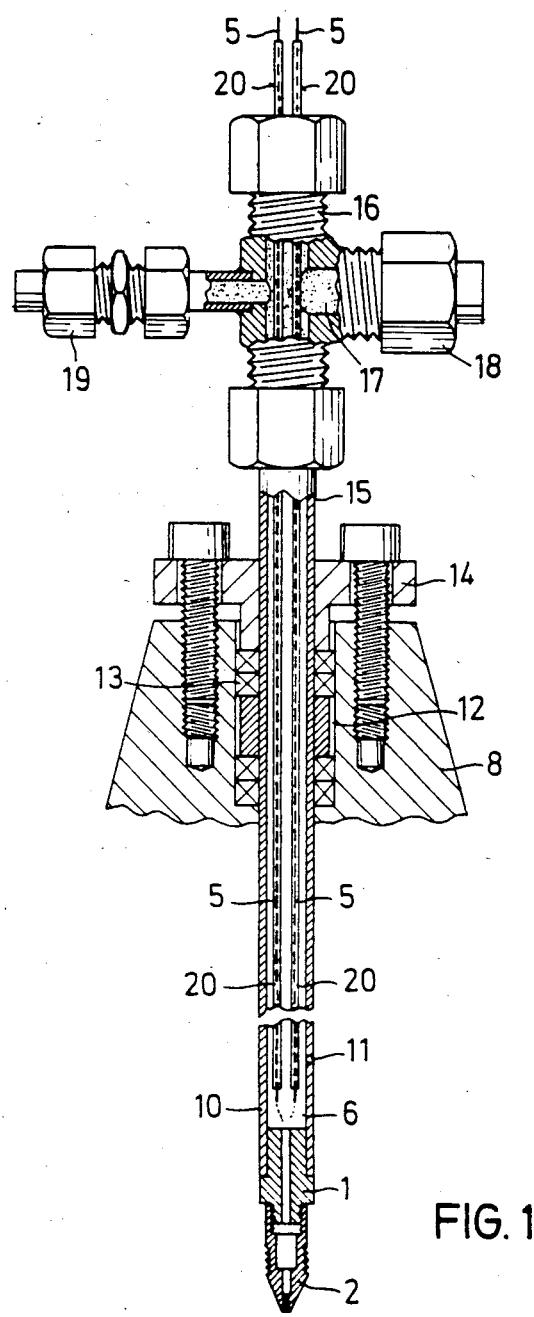
FIG. 1 shows a view in cross-section of a probe tube which is introduced into a reaction container.
Figure 2:
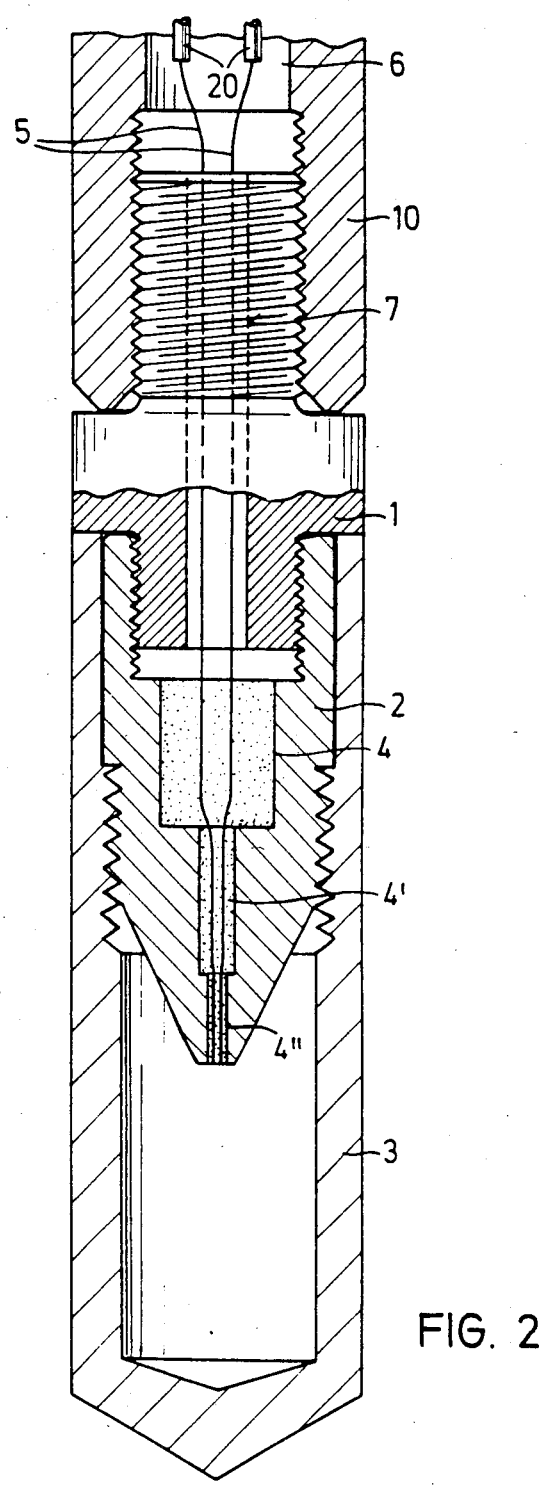
FIG. 2 shows the region of the measuring sensor of the probe tube, on an enlarged scale.

The probe or sample tube 10 is closed in the region of its lower part which projects into the interior of a reaction container 8, by a double-sided threaded portion 1 which has a central bore 7 passing therethrough in the longitudinal direction thereof. Screwed onto the free screwthread of the screwthreaded portion 1 is the measuring sensor 2 which, besides a matching female screwthread, also has further bores 4 through 4" which are of different diameters and which are disposed in succession in the axial longitudinal direction of the measuring sensor 2.

The measuring sensor 2 is of a tapered configuration at its outer end; the finest bore 4" of the bores 4, 4' and 4" which pass through the measuring sensor terminates in the tip of the conical configuration.

The stepping in respect of the diameters of the bores and the lengths of the bores in the region of the measuring sensor are so selected that the tips of the measuring lines 5 which are fed thereto by way of the probe tube 10 and through the bore 7 are brought towards each other only at the outermost end, that is to say, in the region of the finest bore 4" of the bores 4, 4' and 4", so that the measuring lines cannot influence each other in the portion and region of the probe tube which is upstream of the tips of the measuring lines, while in addition the measuring lines can be securely and reliably embedded in their mutually relative positions in the measuring sensor. The embedding effect is provided by means of a casting or sealing material based on a two-component adhesive, wherein the bores 4, 4' and 4" are filled with such material after the end portions of the measuring lines 5 have been fitted into the bores 4, 4' and 4". The casting or sealing material in the region of the measuring sensor is distinguished by a particularly high level of resistance to temperature. In contrast, it is not also resistant to pressure and gas-tight.

In order to protect it from external damage during transportation or storage, the measuring sensor 2 is additionally surrounded by a protective sleeve 3 which is screwed onto the tapered tip of the measuring sensor 2 in such a way as to fit thereover, being removed before the probe tube is introduced into the reaction container 8.

As can be seen from FIG. 1, the probe tube 10 is introduced into the reaction container 8 by way of a suitable opening 12 which is filled or closed off with sealing packings 13 and a flanged cover 14, with the probe tube being secured in position at that location at any height or depth by a clamping effect.

The interior of the reaction container 8 communicates with the interior 6 of the probe tube 10 by way of the communicating bore 11. The probe 10 is closed off by a screw joint 16 at its upper end 15 where it projects out of the reaction container 8. At the upper end of the screwjoint 16, the measuring lines 5 are taken out of the assembly or are passed thereto respectively from the corresponding measuring equipment or generators. The measuring lines are for example glass fibres which are between 50 and 250 μm in diameter, preferably 150 μm.

The measuring lines 5 pass by way of the screwjoint 16 into the space 6 inside the probe tube 10, within which they are each disposed in a respective guide tube 20 in order to terminate with their tips in the measuring sensor 2, as described above.

The guide tubes 20 terminate in the region of the bore 4.

As can be seen from the sectional part of the screw coupling 16 in FIG. 1, the space 17 inside the screwcoupling 16 is filled with a casting or sealing material. That material also comprises a two-component adhesive which however, in comparison with the material in the bores 4 of the measuring sensor 2, is distinguished by a particularly high degree of resistance to pressure and gas-tightness. The connections 18 and 19 which are respectively shown on the right and on the left of the screwjoint 16 are so selected that, when the screw connection 19 is slightly opened for the purposes of venting, the casting or sealing material can be introduced or injected by way of the screw connection 18 until the material fills the entire space inside the screwjoint 16, in a pore-free manner. After venting by way of the connection 19, the connection 19 is closed and the connection 18 is likewise closed. The measuring lines 5 and the guide tubes 20 containing them are now embedded in the interior 17 of the screwjoint 16 in a pressure-resistant and gas-tight manner, being securely fixed in position relative to each other.

In operation, laser light is introduced for example by way of the left-hand connection of the measuring line 5, the laser light passing through the measuring line 5 to the narrowest bore 4″ of the measuring sensor 2, where it issues therefrom. As long as there is no gas bubble at the tapered tip of the measuring sensor 2, the laser light passes unreflected into the medium in the interior of the reaction vessel 8, and is absorbed by that medium.

If however there is a gas bubble at the tip of the measuring sensor, the laser light which is supplied to that point by the measuring line 5 is at least partly reflected by the gas bubble so that a corresponding quantity thereof can pass back into the right-hand run of the measuring line 5, and issue therefrom. The number and intensity of the reflected pulses are a measurement in respect of the amount of gaseous phase dissolved in the medium in the reaction vessel.

The interior 6 of the probe tube 10 is filled with an oil, preferably a mineral oil, which communicates with the medium in the interior of the reaction vessel 8 by way of the communicating bore 11.

As soon as the pressure in the interior of the container 8 alters, a pressure equalization effect occurs, by way of the communicating bore 11, between the interior 6 of the probe tube 10 and the interior of the container 8. That arrangement provides that the same pressure obtains on both sides of the measuring sensor 2, namely both on the side of the fine bore 4″ at the tapered tip thereof and also on the side of the wide inward bore 4. The casting or sealing material in the bores 4″ is thus relieved of pressure and there are no forces which could alter the position of that material. In that way, the ends of the measuring lines 5 which are embedded in the casting or sealing material within the bores 4 are protected from damaging mechanical influences.

We claim:

1. A probe tube which can be introduced into a reaction container for detecting the operating condition of a solid, liquid or gaseous medium in the interior of the container under pressure and temperature, the probe tube having a measuring sensor at one end and measuring lines which are passed through the interior of the probe tube and taken out at the other end thereof, characterised in that the probe tube (10) is provided with a first sealing means in the region of the measuring sensor (2) which is resistant to temperature and a second sealing means proximate the other end which is resistant to pressure and is gas-tight, the interior (6) of the probe tube (10) between the two sealing means being filled with a medium substantially resistant to pressure and temperature and different from the medium within the reaction container which communicates with the medium in the interior of the reaction container (8) by way of an opening (11) having a diameter that is small in comparison to the length of the probe tube.

2. A probe tube according to claim 1 characterised in that the medium in the interior (6) of the probe tube is an oil.

3. A probe tube according to claim 2 wherein the oil is mineral oil.

4. A probe tube according to claim 1 characterised in that the first sealing means comprises a two-component adhesive.

5. A probe tube according to claim 1 characterised in that the second sealing means (17) comprises a two-component adhesive.

6. A probe tube which can be introduced into a reaction container for detecting the operating condition of a solid, liquid or gaseous medium in the interior of the container under pressure and temperature, the probe tube having a measuring sensor at one end and measuring lines which are passed through the interior of the probe tube and taken out at the other end thereof, characterised in that the probe tube (10) is provided with a first sealing means in the region of the measuring sensor (2) which is resistant to temperature and a second sealing means proximate the other end which is resistant to pressure and is gas-tight, the interior (6) of the probe tube (10) between the two sealing means being filled with an oil which communicates with the medium in the interior of the reaction container (8) by way of an opening (11).

7. A probe tube according to claim 6 wherein the oil is mineral oil.

* * * * *